(12) United States Patent
Murray et al.

(10) Patent No.: US 12,251,675 B2
(45) Date of Patent: Mar. 18, 2025

(54) METHODS AND APPARATUS FOR TRIGGERING EXOTHERMIC REACTIONS USING AC OR DC ELECTROMAGNETICS

(71) Applicant: IHJ Holdings Ltd., St. Helier (JE)

(72) Inventors: Joseph A. Murray, Raleigh, NC (US); Julie Anne Gordon, Coppell, TX (US); Tushar Tank, Raleigh, NC (US)

(73) Assignee: IHJ Holdings Ltd., St. Helier (JE)

( * ) Notice: Subject to any disclaimer, the term of this patent is extended or adjusted under 35 U.S.C. 154(b) by 34 days.

(21) Appl. No.: 18/300,967

(22) Filed: Apr. 14, 2023

(65) Prior Publication Data

US 2023/0271154 A1 Aug. 31, 2023

Related U.S. Application Data

(63) Continuation of application No. 16/783,497, filed on Feb. 6, 2020, now Pat. No. 11,628,414, which is a continuation of application No. PCT/US2018/045305, filed on Aug. 6, 2018.

(60) Provisional application No. 62/542,022, filed on Aug. 7, 2017.

(51) Int. Cl.
*B01J 19/08* (2006.01)
*B01J 19/24* (2006.01)

(52) U.S. Cl.
CPC .............. *B01J 19/087* (2013.01); *B01J 19/24* (2013.01); *B01J 2219/0803* (2013.01); *B01J 2219/0854* (2013.01); *B01J 2219/0862* (2013.01)

(58) Field of Classification Search
CPC .......... B01J 19/00; B01J 19/08; B01J 19/087; B01J 19/24; B01J 2208/00; B01J 2208/00008; B01J 2208/00017; B01J 2208/00433; B01J 2219/00; B01J 2219/00049; B01J 2219/00051; B01J 2219/00139; B01J 2219/08; B01J 2219/0803; B01J 2219/085; B01J 2219/0854; B01J 2219/0862; B01J 2219/0866; Y02E 30/00; Y02E 30/10

See application file for complete search history.

(56) References Cited

U.S. PATENT DOCUMENTS

| 4,579,080 A | 4/1986 | Martin et al. |
| 5,822,669 A | 10/1998 | Okabayashi et al. |
| 5,958,273 A | 9/1999 | Koch et al. |
| 11,628,414 B2 | 4/2023 | Murray |

(Continued)

FOREIGN PATENT DOCUMENTS

| CN | 104667832 A | 6/2015 |
| WO | 2017036794 A1 | 3/2017 |

OTHER PUBLICATIONS

PCT, International Search Report and Written Opinion in International Application No. PCT/US2018/045305 dated Jan. 3, 2019.

(Continued)

*Primary Examiner* — Natasha E Young
(74) *Attorney, Agent, or Firm* — NK Patent Law

(57) ABSTRACT

Methods and apparatus are disclosed for generating an electromagnetic field inside a reactor to trigger an exothermic reaction. The design and implementation of the electromagnetics are based on the requirements of a particular exothermic reaction or reactor. For example, the triggering mechanism of a particular exothermic reaction or reactor may require a magnetic field with a specific magnitude, polarity, and/or orientation.

16 Claims, 7 Drawing Sheets

(56) References Cited

U.S. PATENT DOCUMENTS

2010/0329938 A1 12/2010 Allan
2017/0094726 A1 3/2017 Elserman et al.
2017/0260634 A1 9/2017 Sullivan

OTHER PUBLICATIONS

CN; First Office Action for Chinese Patent Application No. 201880065033.0 dated Aug. 30, 2021, 8 pages.
CN; Translation for First Office Action for Chinese Patent Application No. 201880065033.0 dated Aug. 30, 2021, 2021, 3 pages.
PCT, International Preliminary Report on Patentability in International Application No. PCT/US2018/045305 dated Feb. 11, 2020.

METHODS AND APPARATUS FOR TRIGGERING EXOTHERMIC REACTIONS USING AC OR DC ELECTROMAGNETICS

CROSS-REFERENCE TO RELATED APPLICATIONS

This application is a continuation of U.S. Non-Provisional patent application Ser. No. 16/783,497, now U.S. Pat. No. 11,628,414, filed on Feb. 6, 2020, entitled "METHODS AND APPARATUS FOR TRIGGERING EXOTHERMIC REACTIONS USING AC OR DC ELECTROMAGNETICS" which is a continuation of International Application No. PCT/US18/45305, now WO 2019/032415, filed on Aug. 6, 2018, entitled "METHODS AND APPARATUS FOR TRIGGERING EXOTHERMIC REACTIONS USING AC OR DC ELECTROMAGNETICS", which claims priority to U.S. Provisional Patent Application No. 62/542,022 filed on Aug. 7, 2017, entitled "METHODS AND APPARATUS FOR TRIGGERING EXOTHERMIC REACTIONS USING AC OR DC ELECTROMAGNETICS", the entire contents of which are incorporated by reference herein.

TECHNICAL FIELD

The present disclosure relates generally to how to trigger an exothermic reaction, and more specifically, to triggering an exothermic reaction using AC or DC electromagnetics.

BACKGROUND

Exothermic reactions involving metal hydrides, such as palladium hydride or nickel hydride, have been observed and documented on many occasions. However, reproducibility of these exothermic reactions has been a noted problem. Scientists and engineers have tried to determine the exact conditions under which those exothermic reactions can be triggered and sustained. Yet, many issues remain unresolved and many questions are still waiting to be answered.

For example, studies of past reported exothermic reactions show that the amount of deuterium loaded in the palladium hydride or nickel hydride is critical in one type of exothermic reactions in which low energy nuclear reactions involving deuterium atoms take place inside the palladium lattice. However, the threshold atom ratio of loaded deuterium to palladium is still in debate and largely speculative. For another example, the exact nature of these exothermic reactions needs to be verified and confirmed. To that end, precise calibration and heat measurements are required in these heat generation experiments. However, it appears that the above-noted problems that have been plaguing this technological field stem from the reproducibility of these exothermic reactions. Reliable triggering mechanisms are needed ab initio before many questions in this field can be answered.

The present disclosure teaches advantageous methods and apparatus for triggering an exothermic reaction.

SUMMARY

The present disclosure relates to how to trigger an exothermic reaction.

In some embodiments, a method for inducing a magnetic field in an exothermic reactor to trigger an exothermic reaction is disclosed. The exothermic reactor comprises a vessel and one or more reaction materials. The reactor maintains a pressure and a temperature and is surrounded by one or more coils. The method comprises supplying a current to the one or more coils. The strength of the current is determined based on a desired characteristic of the magnetic field. The method further comprises switching off the current after a first time period. The magnetic field is designed to trigger the exothermic reaction. The first time period is also selected so that it is conducive to triggering the exothermic reaction. The pre-determined magnetic field and the selected time period are dependent on the type of the exothermic reactor or reaction. In one embodiment, the desired characteristic of the magnetic field and the first time period depend on one or more of the following factors: the reaction materials, the temperature, the pressure, the substrate used for holding the one or more reaction materials, the shape of the exothermic reactor, and the size of the exothermic reaction.

In one embodiment, both the magnitude and the polarity of the magnetic field are pre-determined for triggering an exothermic reaction. For example, the current is supplied to the one or more coils and the current induces a magnetic field. The strength of the current is 20 A. In some other embodiments, the current typically ranges from 100 mA to 60 A. The magnitude of the magnetic field increases until the current is switched off after the first time period. The first time period is calculated based on a desired magnitude of the magnetic field and the current.

In one embodiment, the current is supplied to the one or more coils for the first time period. The first time period is determined based on the desired strength of the magnetic field and the current. The strength of the magnetic field increases until the current is switched off. In one embodiment, the current is switched off after a first time period and is switched on after a second time period. The direction of the current may be reversed when the current is turned on again. The frequency at which the direction of the current is reversed is determined so at to trigger the exothermic reaction. In yet another embodiment, the current is turned on and off periodically with a predetermined frequency for triggering the exothermic reaction.

In some embodiments, the two coils are placed in parallel and the magnetic field generated by the first coil is aligned with the magnetic field generated by the second coil. In some embodiments, the first coil is placed perpendicular to the second coil and the currents running through the first and second coil are turned on and off alternately, i.e., phase-shifted by 180° relatively to each other. The currents in the first and second coils may be phase locked.

The present disclosure also discloses an apparatus for inducing a magnetic field in an exothermic reactor to trigger an exothermic reaction. The exothermic reactor comprises a vessel and one or more reaction materials. The reactor maintains a temperature and a pressure. The apparatus comprises one or more coils and one or more power supplies for supplying a current to the one or more coils. The power supplies are configured to supply the current to the one or more coils and switch off the current after a first time period. In one embodiment, both the magnitude and the polarity of the magnetic field are pre-determined for triggering an exothermic reaction. For example, the current is supplied to the one or more coils and the current induces a magnetic field. The strength of the current is 20A. In some other embodiments, the current typically ranges from 100 mA to 60A. The magnitude of the magnetic field increases until the current is switched off after the first time period. The first time period is calculated based on a desired magnitude of the magnetic field and the current.

In one embodiment of the apparatus, the current is supplied to the one or more coils for the first time period that is determined based on the desired strength of the magnetic field and the current. The strength of the magnetic field increases until the current is switched off. In one embodiment, the current is switched off after a first time period and is switched back on after a second time period. The direction of the current may be reversed when the current is switched back on. The frequency at which the direction of the current is reversed is determined for triggering the exothermic reaction. In yet another embodiment of the apparatus, the current is turned on and off periodically with a predetermined frequency for triggering the exothermic reaction.

In some embodiments of the apparatus, the two coils are placed in parallel and the magnetic field generated by the first coil is aligned with the magnetic field generated by the second coil. In some embodiments, the first coil is placed perpendicular to the second coil and the currents running through the first and second coil are turned on and off alternately, i.e., phase-shifted by 180° relatively to each other. The currents in the first and second coils may be phase locked.

DETAILED DESCRIPTION

Figure 1:
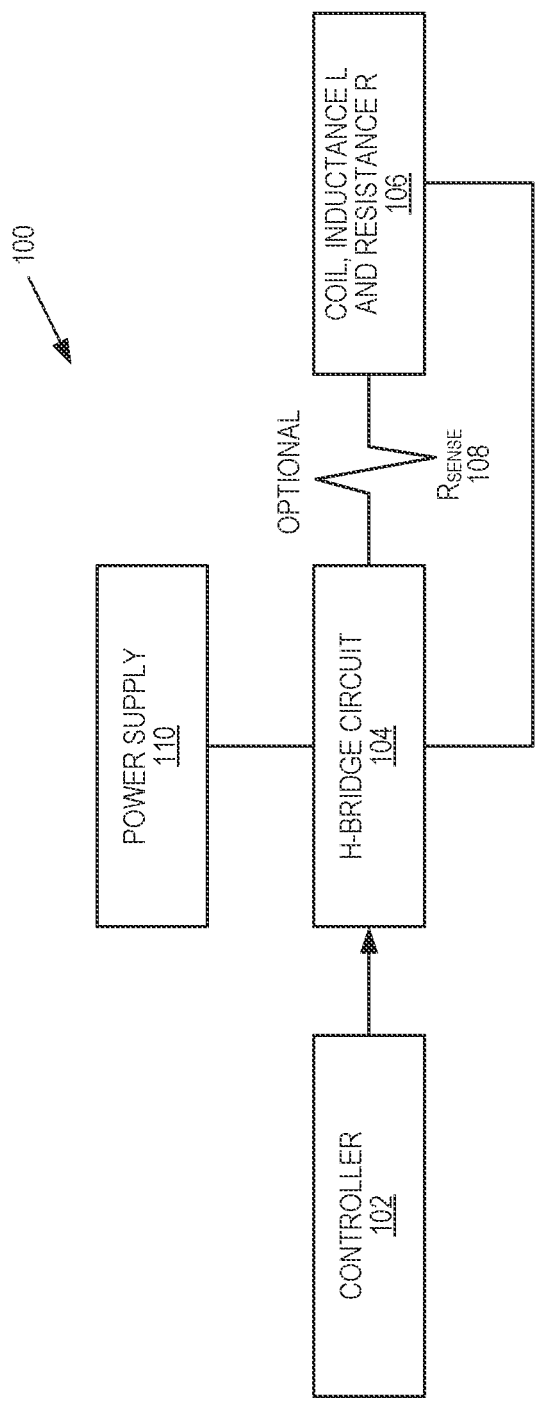
FIG. 1 illustrates an exemplary power supply circuit configured to generate electromagnetic fields for triggering an exothermic reaction.

In referring to FIG. 1, a block diagram illustrating an exemplary electric circuit 100 that comprises a controller 102, an H-Bridge circuit 104, a coil 106, an optional resistor Rsense 108 and a power supply 110. The circuit 100 is configured to generate magnetic fields of desired magnitudes and/or polarities by controlling the current that runs through the coil 106. In some embodiments, the coil 106 is a piece of metal wire with inductance L and resistance R. The H-Bridge Circuit 104 is configured to apply a reversible and variable voltage across the coil to generate variable currents of reversible directions. The controller 102 controls the H-Bridge Circuit 104. The controller 102 can be configured or programmed to enable the H-Bridge Circuit 104 to apply suitable voltages over the coil 106. The voltage over the coil 106 induces a current across the coil 106. The current generates a magnetic field in the space surrounding the coil.

It is known in previous studies that a magnetic field of a suitable strength and polarity can trigger certain types of exothermic reactions. However, those studies are preliminary and do not provide sufficient details on the circuit used to generate the magnetic field and on the exact configuration of the magnetic field that can trigger the exothermic reactions. The present disclosure teaches methods and apparatus that can be utilized to generate a suitable magnetic field, of which the magnitude and polarity inside the reactor is designed to trigger an exothermic reaction. Depending on the type of the exothermic reactions or reactors, the characteristics of the triggering magnetic field may differ and the current supplied to the coil 106 will vary accordingly. For example, the following factors may be taken into consideration in designing a magnetic field as triggering mechanism: the reaction materials used in the reaction, whether they are ferromagnetic, for instance, the temperature, the pressure, a substrate used for holding the one or more reaction materials, the shape of the exothermic reactor, and the size of the exothermic reaction.

Figure 2A:
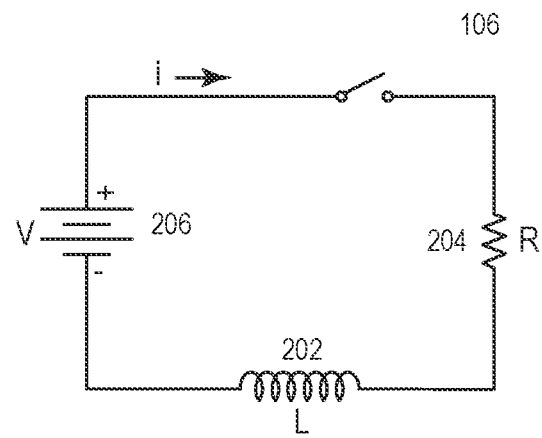
FIGS. 2A and 2B illustrate an exemplary RL circuit and a current profile generated by the RL circuit.
Figure 2B:
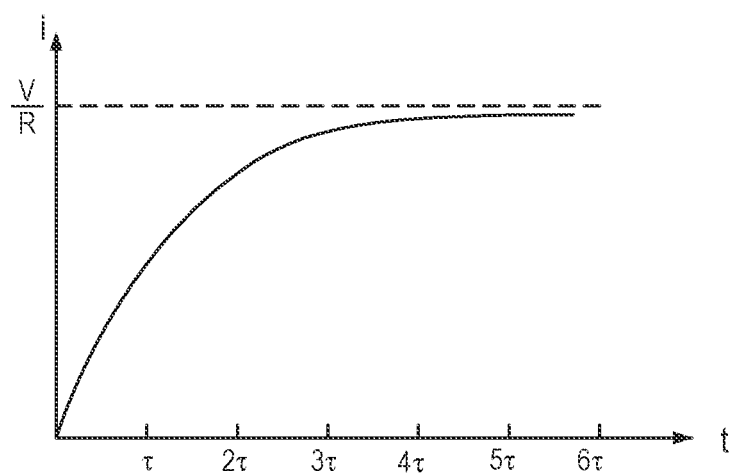

FIG. 2A illustrates a simplified circuit representation of the coil 106 and FIG. 2B depicts an exemplary current induced in the coil 106 by the circuit 100. In FIG. 2A, the coil 106 is represented by an ideal inductor 202 of inductance L and an ideal resistor 204 of resistance R. The voltage applied across the coil 106 is represented by the power source 206 of voltage V. The current in the coil 106 as a function of time is depicted in FIG. 2B.

$$\tau = \frac{L}{R}$$

is a time scale that measures the rate at which the current in the coil 106 increases. When the voltage V is applied to the coil 106, the current ramps up and quickly reaches the maximum value $\frac{V}{R}$ within a time period of 3τ-5τ. Parameter τ sets the limit on how fast the current induced in the coil 106 can change in response to the applied voltage V.

Figure 3A:
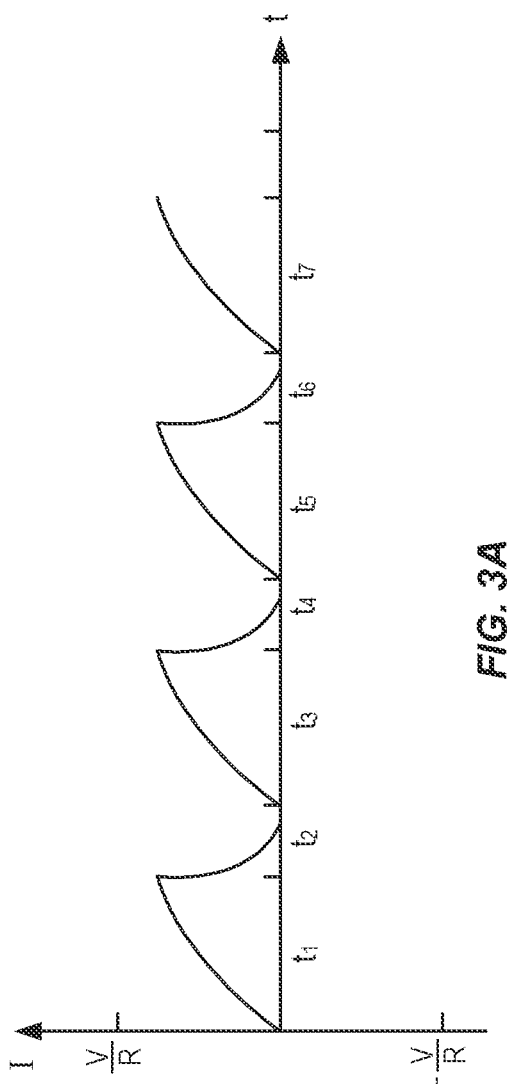
FIGS. 3A-5 illustrate exemplary current profiles generated by RL circuits.
Figure 3B:
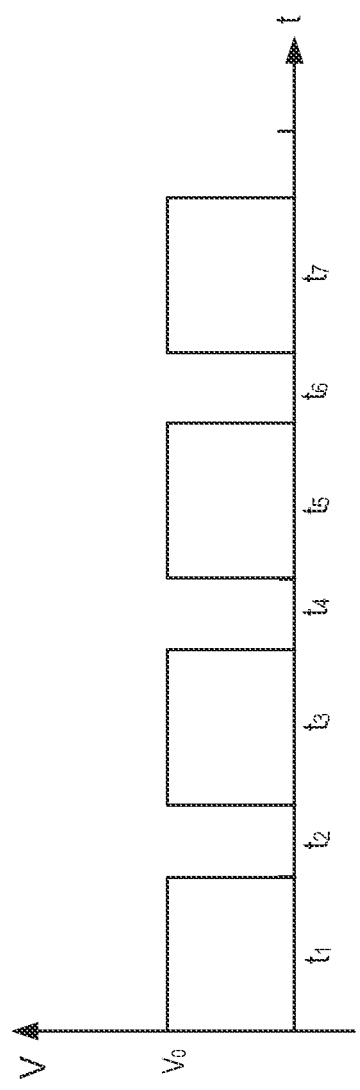

FIG. 3A illustrates the current, i, induced in the coil 106 as a function of time in response to the voltage V applied across the coil 106 as shown in FIG. 3b. The voltage V is switched on and off periodically. It is switched on for a time period of $t_1$ and then switched off for a time period of $t_2, \ldots,$ and switched on for a time period of $t_{2i-1}$ and switched off for a time period of $t_{2i+1}$. The current induced in the coil 106 in response to the applied voltage V is shown in FIG. 3A. The current ramps up and drops down in response to the switching on and off of the voltage. Because the voltage is switched off before 5τ, the voltage is switched off before the current could reach the maximum value $\frac{V}{R}$. During $t_2$, the current drops down to zero more precipitously.

Figure 4:
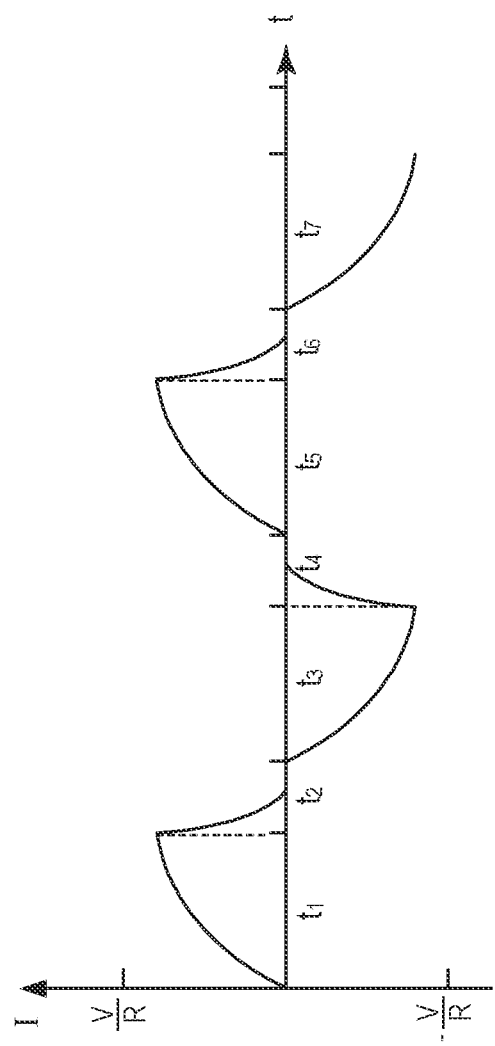

FIG. 4 illustrates another variable current as a function of time. In FIG. 4, the direction of the current is reversed each time the current is turned on. For example, the voltage across the coil 106 is applied during time period $t_1$ and is turned off during time period $t_2$. The voltage is turned on again during time period $t_3$ but the polarity is reversed. As a result, the current in the coil 106 is positive during time period $t_1$ and negative during time period $t_3$. The current becomes positive again during time period $t_5$ and so on and so forth. The direction of the current dictates the direction of the magnetic field generated by the current under the right hand rule. When the direction of the current in the coil 106 is reversed, the direction of the magnetic field is reversed. By programming the controller 102, the time periods, $t_1, t_2, t_3 \ldots,$ can be adjusted to produce a desired magnetic field according to specification.

Figure 5:
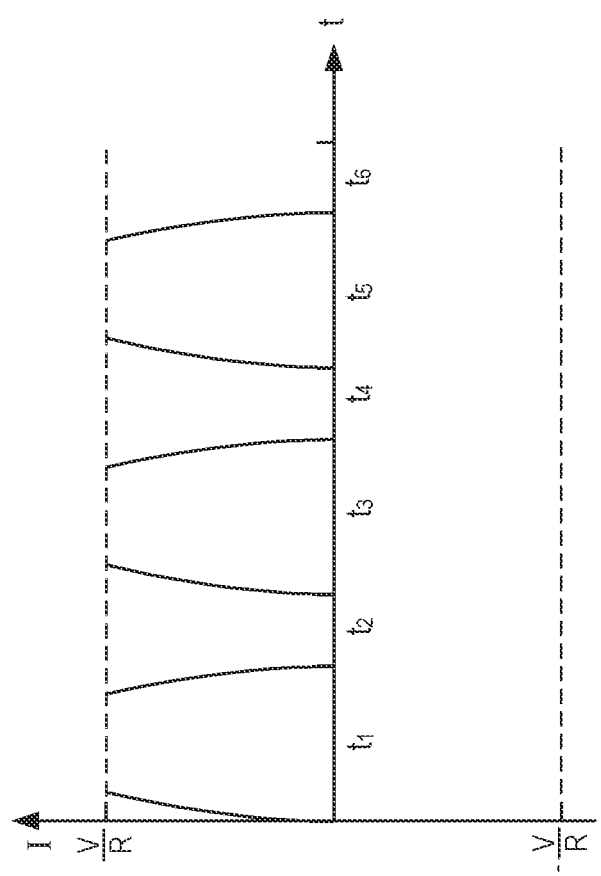

In FIG. 3A and FIG. 4, during time period $t_1, t_3, t_5 \ldots,$ the current in the coil 106 does not reach the maximum value, $\frac{V}{R}$, before it is switched off. FIG. 5 illustrates a variable current supplied to the coil 106 that reaches the maximum value $\frac{V}{R}$ within approximately 5τ and maintains the maximum value for an extended time before it is switched off. After it is switched off, the current drops down to zero within a time period of $5\tau$. The current is turned off during time period $t_2$ and is turned back on during time period $t_3$. During time period $t_3$, the current stays at the maximum value, $\frac{V}{R}$, for a majority portion of the duration. When the current reaches the maximum value, the magnitude of the magnetic field induced by the current reaches its maximum and the maximum magnetic field is maintained for the majority portion of the duration. In some embodiments, the magnetic field is used as a triggering mechanism of an exothermic reaction. The magnitude, the polarity and/or the variability of the magnetic field are characteristics or parameters that should be carefully determined in accordance to the re requirements of the exothermic reaction or reactor. Based on the requirements, the controller 102 can be programmed to control the H-Bridge Circuit 104 to supply the current to the coil 106 according to specification.

Figure 6A:
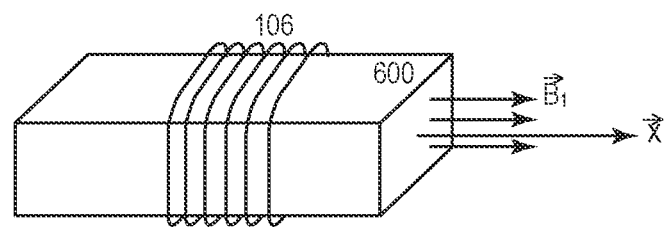
FIGS. 6A-6D illustrate different configurations of one or more electromagnetic circuits placed around a reactor.
Figure 6B:
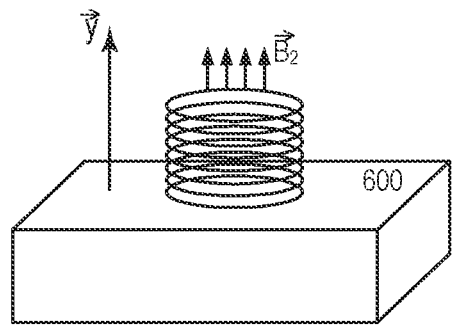

To produce a magnetic field of a desired magnitude or polarity, the current in the coil 106 can be adjusted as well as the placement of the coil or coils 106. FIGS. 6A-6D illustrate different placements of one or more coils 106. In FIG. 6A, a coil 106 is wrapped around a reactor 600 longitudinally. The magnetic field $\vec{B}_1$ produced by the current in the coil 106 runs parallel to the $\vec{x}$ axis. FIG. 6B illustrates a coil 106 configured to generate a desired magnetic field $\vec{B}_2$ along the $\vec{y}$ axis. The coil 106 is placed on top of the reactor 600.

Figure 6C:
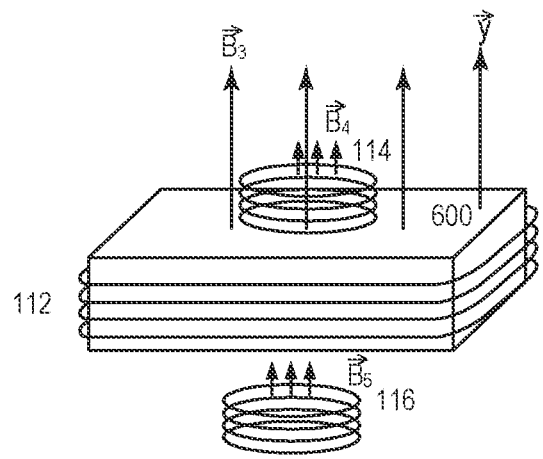
Figure 6D:
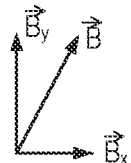
Figure 6D:
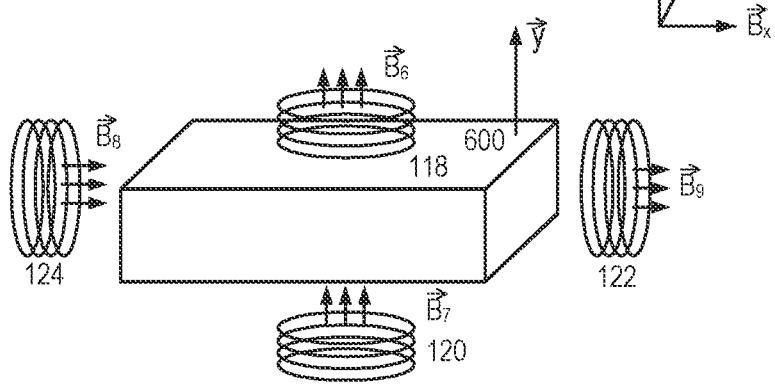

To enhance the strength of a magnetic field produced by a coil, multiple coils arranged in parallel can be used as shown in FIG. 6C and FIG. 6D. In FIG. 6C, a large coil 112 is wrapped around a reactor 600 longitudinally. Two small coils 114 and 116 are placed in parallel with the large coil 112, one on top of the reactor 600 and one beneath the reactor 600. The magnetic fields generated by the three parallel coils, $\vec{B}_3$, $\vec{B}_4$, $\vec{B}_5$, run parallel to the $\vec{y}$ axis and enhance each other. The total magnetic field is the vector summation of the three magnetic fields.

FIG. 6D shows another configuration of multiple coils so arranged to generate a magnetic field of a desired magnitude and polarity. Around the reactor 600, the coils 118 and 120 are placed horizontally on top of and horizontally beneath the reactor 600 respectively, while the coils 122 and 124 are placed vertically to the right and vertically to the left of the reactor 600 respectively. The coils 118 and 120 produce magnetic fields $\vec{B}_6$ and $\vec{B}_7$ that run parallel to the $\vec{y}$ axis. These two magnetic fields, $\vec{B}_6$ and $\vec{B}_7$, enhance each other. The sum of these two fields is $\vec{B}_y = \vec{B}_6 + \vec{B}_7$. Along the $\vec{x}$ axis, the two vertically placed coils, 122 and 124, generate a magnetic field respectively. The sum of these two fields is $\vec{B}_x = \vec{B}_8 + \vec{B}_9$. The two magnetic fields, $\vec{B}_x$ and $\vec{B}_y$, combine to yield a resultant magnetic field $\vec{B} = \vec{B}_x + \vec{B}_y$. This resultant magnetic field is designed to trigger an exothermic reaction in the reactor 600 in accordance to the requirements of the exothermic reaction or the reactor 600.

In yet another embodiment, a Helmholtz coil may be employed to generate a uniform magnetic field inside the reactor. The placement of the coil determines the orientation and polarity of the field. The Helmholtz coil is configured to generate a magnetic field of a desired magnitude to trigger an exothermic reaction.

In the above description of FIGS. 6A-6D, the current supplied to the coils 106 is assumed to be the same, for the convenience of illustration. In some embodiments, the current supplied to the coils 106 may be different, depending on the desired strength, polarity and/or orientation of the magnetic field. For instance, in FIG. 6D, when the current supplied to the coil 118 and 120 is twice as large as the current supplied to the coil 122 and 124, the magnetic field $\vec{B}_y$ is twice as large as the magnetic field $\vec{B}_x$, yielding a resultant magnetic field $\vec{B}$ of a different orientation and magnitude.

In the above description of FIGS. 6A-6D, the magnetic fields generated by the coils 106 are static when the current supplied to various coils are DC. With AC currents, the generated magnetic fields are variable. The frequencies with which the magnetic fields shift directions and/or vary in magnitude are determined by the frequency of the AC currents. For example, an AC current of 50 Hz supplied to the coil 106 in FIG. 6A will produce a sinusoidal magnetic field $\vec{B}$. The direction of the magnetic field $\vec{B}$ oscillates along the $\vec{x}$ axis at a frequency of 50 Hz.

Figure 7A:
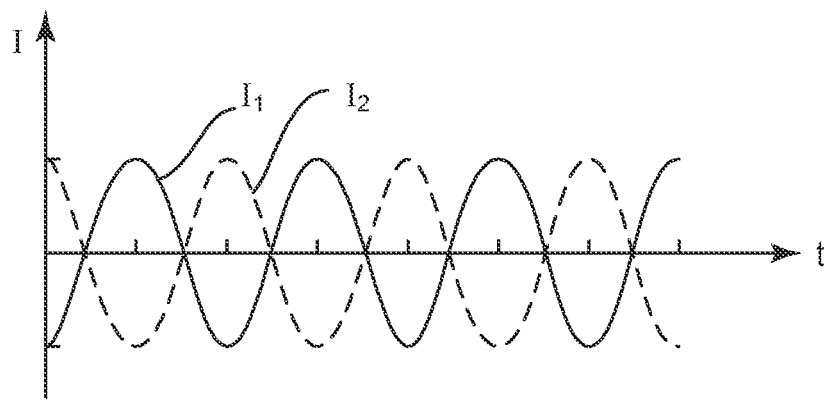
FIGS. 7A-7C illustrate examples of AC currents supplied to the electromagnetic circuits.

In some embodiments, the AC currents supplied to the different coils are phase-shifted relatively to each other. For example, in FIG. 6C, the AC current supplied to the coil 114 and 116, $I_1$, is 180° shifted from the AC current supplied to the coil 112, $I_2$, as shown in FIG. 7A. In one embodiment, the two AC currents are phase-locked to create a steadily oscillating magnetic field of the same frequency as the AC currents.

Figure 7B:
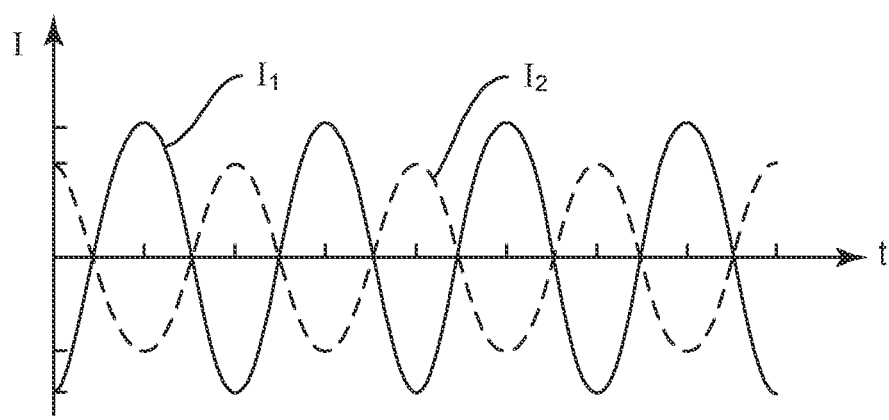

In some embodiments, the currents supplied to the different coils may be phase-shifted relatively to each other and may be of different amplitudes. For example, as illustrated in FIG. 7B, the current supplied to the coil 114 and 116, $I_1$, and the current supplied to the coil 112, $I_2$, are phase-shifted 180° relatively to each other. Besides the difference in phase, the two currents, $I_1$ and $I_2$, also differ in amplitude. As a result, the resultant magnetic field differs from that shown in FIG. 7A, because the magnetic field generated by a current carrying coil is proportional to the amplitude of the current according to Ampere's law.

Figure 7C:
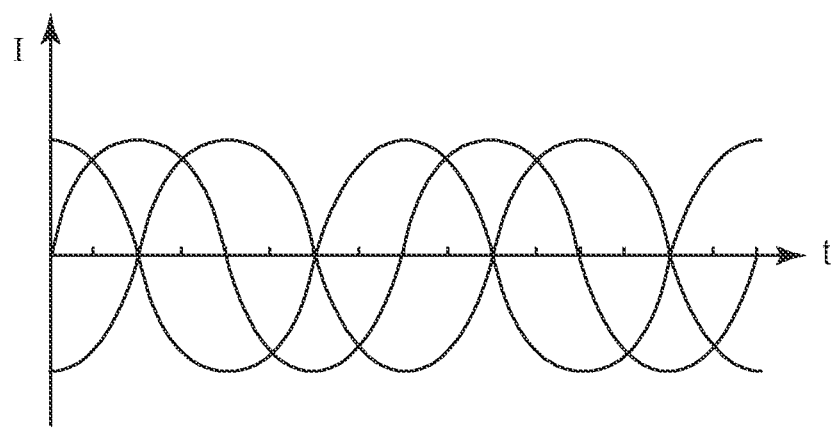

In FIGS. 7A and 7B, two-phase currents are used to generate a desired magnetic field as a triggering mechanism of an exothermic reaction in the reactor 600. Multi-phase currents, e.g., currents supplied by a three-phase circuit, can be used to generate a rotating magnetic field. FIG. 7C shows a balanced three phase currents, $I_1$, $I_2$, and $I_3$. All three currents are of the same amplitude but each is 120° shifted from the next one. The magnetic field generated by the currents can be expressed as $\vec{B}(\sin \alpha t + \sin(\alpha t + 120) + \sin(\alpha t + 240))$ and is a rotating magnetic field.

In some embodiments, a static magnetic field generated by a DC current supplied to the coil 106 shown in FIG. 6A can be used to trigger certain types of exothermic reactions in the reactor 600. The magnitude and/or the polarity of the magnetic field can be controlled by the current and the placement of the coil 106, in accordance to the requirements of the exothermic reaction.

In some embodiments, an oscillating magnetic field generated by the AC current supplied to the coils 118, 120, 122, and 124 can be used to trigger a certain type of exothermic reactions. In some embodiments, a rotating magnetic field generated by a balanced three-phase current system supplied to the coils 112, 114, and 116 can be used as triggering mechanism.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A magnetic field induction apparatus for use with an exothermic reactor to trigger an exothermic reaction, the exothermic reactor comprising a vessel capable of maintaining a temperature and pressure, and one or more reaction materials, said apparatus comprising:
   one or more coils disposed adjacent to and outside of the vessel to induce at least one magnetic field therein;
   at least one power supply electronically coupled to the one or more coils and configured to induce at least one current within the one or more coils to produce the at least one magnetic field; and
   a controller, in operable communication with the at least one power supply, configured to:
      operate the at least one power supply based on one or more predefined current strength setpoints and one or more predefined time periods stored within the controller,
         wherein each of the current strength setpoints is associated with a
         strength and polarity of the at least one magnetic field, control the at least one current induced in the one or more coils dynamically based on variations in the strength and polarity of the at least one magnetic field, the one or more predefined current strength setpoints, and the one or more predefined time periods.

2. The apparatus of claim 1, wherein variations in the strength and polarity of the at least one magnetic field includes an increase rate for the at least one magnetic field when current is induced in the one or more coils.

3. The apparatus of claim 1, wherein the one or more predefined time periods include a portion wherein the strength of the at least one magnetic field is maintained at a maximum.

4. The apparatus of claim 1, wherein the one or more predefined time periods include a first time period and a second time period wherein the at least one current induced in the one or more coils for the first time period is in a reversed direction compared that of the second time period.

5. The apparatus of claim 1, wherein the controller one or more predefined time periods form a frequency and the frequency is utilized to one or more of trigger and maintain the exothermic reaction.

6. The apparatus of claim 1, wherein a first coil of the one or more coils is parallel to a second coil of the one or more coils, and wherein the magnetic field generated by the first coil has a first direction parallel to a second direction associated with the magnetic field generated by the second coil.

7. The apparatus of claim 1, wherein a first coil of the one or more coils is perpendicular to a second coil of the one or more coils, and wherein the at least one power supply alternately induces at least one current through the first coil and at least one current through the second coil.

8. The apparatus of claim 7, wherein the at least one current provided by the at least one power supply through the first coil and the at least one current provided by the at least one power supply through the second coil are phase locked.

9. The apparatus of claim 7, wherein the at least one current provided by the at least one power supply the first coil and the at least one current provided by the at least one power supply through the second coil are phase shifted 180 degrees.

10. The apparatus of claim 9, wherein at least one current provided by the at least one power supply through the first coil and the at least one current provided by the at least one power supply through the second coil have different amplitudes.

11. The apparatus of claim 1, wherein the one or more predefined current strength setpoints and the one or more predefined time periods are based further on one or more of the following factors: the one or more reaction materials, the temperature, the pressure, a substrate used for holding the one or more reaction materials, the shape of the vessel, and the size of the exothermic reaction.

12. The apparatus of claim 1, wherein a first coil of the one or more coils is wrapped around the vessel.

13. The apparatus of claim 1, wherein a first coil of the one or more coils is disposed along a peripheral surface of the vessel.

14. The apparatus of claim 1, wherein a first coil of the one or more coils and a second coil of the one or more coils are disposed on opposed sides of the vessel such that the vessel separates the first coil and the second coil.

15. The apparatus of claim 1, wherein a first coil of the one or more coils is larger than a second coil of the one or more coils.

16. The apparatus of claim 1, wherein one or more coils comprises a first coil, a second coil, and a third coil arranged in parallel such that the at least one magnetic field induced by each is parallel to that of the others and forms a combined magnetic field.

* * * * *